United States Patent [19]
Wernimont et al.

[11] Patent Number: 5,258,999
[45] Date of Patent: Nov. 2, 1993

[54] CIRCUIT AND METHOD FOR RECEIVING AND TRANSMITTING CONTROL AND STATUS INFORMATION

[75] Inventors: Thomas L. Wernimont, Palatine; Kevin L. Kloker, Arlington Heights, both of Ill.; Clif Liu, San Diego, Calif.

[73] Assignee: Motorola, Inc., Schaumburg, Ill.

[21] Appl. No.: 770,507

[22] Filed: Oct. 3, 1991

[51] Int. Cl.$^5$ .......................... H04B 1/38; H04L 5/16
[52] U.S. Cl. ......................................... 375/7; 375/121
[58] Field of Search ................................ 375/7, 8, 121

[56] References Cited

U.S. PATENT DOCUMENTS

| | | | |
|---|---|---|---|
| 3,978,449 | 8/1976 | Sanders et al. | 375/121 X |
| 4,677,611 | 6/1987 | Yanosy, Jr. et al. | 370/85.13 |
| 4,706,080 | 11/1987 | Sincoskie | 370/85.13 X |
| 5,025,500 | 6/1991 | Phinney | 370/85.13 |

OTHER PUBLICATIONS

Computer Communications published by ipc science and technology press vol. 2, No. 4, Aug. 1979 pp. 170-171.
"AES Recommended Practice for Digital Audio Engineering—Serial Transmission Format for Lin early Represented Digital Audio Data" published by Audio Engineering Society in 1985, pp. 1-9.
"CP-340 Digital Audio Interface" published by the Standards of Electronic Industries Association of Japan in Sep. 1987, pp. 1-32.

Primary Examiner—Curtis Kuntz
Assistant Examiner—Bryan Webster
Attorney, Agent, or Firm—Elizabeth A. Apperley

[57] ABSTRACT

An interface transceiver (16) circuit and method for communicating transceiver control and status information between a signal processor (20) and either an audio source (12) or an audio sink (24). During transmission of digital audio data from audio source (12) and signal processor (20), a comparator (49) compares a cyclic redundancy check (CRCC) byte of a block of channel status information to a theoretical CRCC byte generated by a CRC generator (48). By comparing actual and theoretical CRCC bytes, comparator (49) indicates in a single bit whether audio data was transmitted correctly. Remaining bits of the CRCC byte are then used to transfer status information corresponding to transceiver (16). Similarly, during transmission of digital data from signal processor (20) to audio sink (24), a parity bit of a subframe of the digital data is used to transfer programming information from signal processor (20) to audio sink (24).

20 Claims, 5 Drawing Sheets

CIRCUIT AND METHOD FOR RECEIVING AND TRANSMITTING CONTROL AND STATUS INFORMATION

FIELD OF THE INVENTION

This invention relates generally to a communications system, and more particularly to the transmission and receipt of digital data in a communications system.

BACKGROUND OF THE INVENTION

In a digital communications system, digital audio data and control information is transmitted in a predetermined serial transmission format such as AES-EBU or CP-340. Both the AES-EBU and CP-340 formats were developed for serial transmission of two channels of both digital audio data and non-audio, or control, data from a transmitter to one or a plurality of receivers.

The AES-EBU and CP-340 formats transmit Manchester encoded digital audio and non-audio data in a series of frames. The digital audio and non-audio data is typically sampled periodically by a source frequency and formed into a left audio or a right audio channel of two's complement data. Two subframes, one for left channel information and a second for right channel information, are transmitted in sequence in any one period of the source frequency. The two subframes may also be collectively referred to as a frame. In the AES-EBU format, each subframe has a length of thirty-two time slots, where each time slot corresponds to a data bit of digital audio or non-audio information. Typically, the first four bits of each subframe are preamble bits. Preamble bits are encoded to synchronize a receiver to the source frequency of the transmitter. The next twenty-four bits transfer audio data information in two's complement form. A next bit is generally referred to as a validity (V) bit. The V bit indicates if the previous audio data information was transmitted to the receiver without any errors. The V bit is a logic zero level when the audio data information is valid and a logic one level when the audio data information was transmitted with errors. Subsequently, a next bit is the user data (U) bit. The U bit contains user data which is associated with either the left or right audio channel. A following bit is the channel status (C) bit. The C bit is used to form a control group of data bits to control transmission of audio and control information. For each one of the left and right audio channels, the control group of data bits is referred to as a channel status block. The channel status block is formed by accessing the C bit of each of 192 successive frames. Typically, the last eight C bits of each block are collectively referred to as the cyclic redundancy check character (CRCC). The CRCC provides information necessary to test for failed reception of the entire block of channel status bits. A start of a block is identified by a special block preamble which replaces a predetermined one of a subframe preamble once every one hundred ninety-two frames. The last bit of a subframe is the parity (P) bit. The P bit indicates even parity of the subframe currently transmitted. Therefore, the P bit is used to easily detect transmission errors and may be used to determine channel reliability.

Both the AES-EBU and CP-340 formats are commonly used for transmitting digital audio and non-audio data from a transmitter to a digital signal processor. Typically, the digital data is provided to an interface receiver where it is modified to a form in which it may be used by the digital signal processor. In an interface transceiver, audio and non-audio data is received and converted into bytes of digital information. The bytes of digital information are then provided to the digital signal processor. Generally, audio and non-audio data corresponding to a left channel is transmitted first, and audio and non-audio data corresponding to a right channel is subsequently transmitted. Information typically required for the digital signal processor to interface and communicate properly with the digital audio source must also be transferred to the interface transceiver.

In particular, control and status information must be provided to the digital signal processor from an interface transceiver. The control and status information which should be monitored is determined by the user of the communications system and may be application dependent, as well. For example, the control and status information may be used to indicate whether or not a plurality of pins of the interface transceiver is programmed, if the signal input to a phase lock loop within the interface transceiver has too high or too low of a frequency, or even if the channel status bits have been transmitted correctly.

Typically, control and status information must first be transferred from the interface transceiver to the digital signal processor via a plurality of either data or control pins. Therefore, in addition to a modulation circuit generally required for transmission of serial data in either the AES-EBU or CP-340 format, additional circuitry must also be implemented within the interface transceiver to modulate status information provided to the digital signal processor by the plurality of either data or control pins. Additionally, circuitry must also be implemented to receive control information from the digital signal processor to the interface transceiver. Although the added circuitry and the dedicated address or data pins are necessary, both generally add to the overhead costs of the interface transceiver.

Additionally, when interfacing between a digital signal processor and either a digital audio source or a digital audio sink, programming information to control operation of the interface transceiver is required and may be provided by the digital signal processor. Programming information is necessary for the interface transceiver to execute a plurality of functions. For example, programming information may provide control and data for programmable output pins or enable multiplexers to select predetermined programmable clock outputs. Programming information may also be necessary to select digital audio inputs and to determine the clock sources necessary for a phase lock loop circuit or a modulator clock source within the interface transceiver.

Like the transfer of control or status information, programming information is generally transmitted from the digital signal processor to the plurality of data input pins of the interface transceiver using a standard data-/address chip select interface. Again, the plurality of data and address input pins of the interface transceiver tends to significantly increase the overhead costs of the interface transceiver. As well, during transmission of both status and programming information, the digital audio data transmitted serially from the digital audio source may be interrupted and remain suspended until the status and programming information is provided to the receiver portion of the transceiver. The time necessary to transmit digital audio data is subsequently lengthened by the time necessary to transmit the status and programming information.

To avoid interrupting a flow of digital audio data, some current implementations of interface transceivers minimize the amount of status information transferred. For example, a single status signal indicating phase lock loop information may be the only status information provided to the digital signal processor. However, although the flow of digital audio data is interrupted for a minimal time, status information concerning operation of the transceiver is not provided to the digital signal processor.

Because current implementations of communication systems typically require status and programming information values necessary for proper operation to respectively either be provided by a plurality of output pins of the interface transceiver or be provided to a plurality of input pins of an interface transceiver, the overhead costs of the interface transceiver are increased. Also adding to the overhead is the typical requirement of needing to be able to interrupt transmission of serial digital data. The efficiency of the interface transceiver is also decreased by the interruption of transmission of the digital audio and non-audio data. Therefore, a need exists to transmit status and programming information without interrupting the transmission of digital audio data. Additionally, a need exists for the status and programming information to be provided to a minimal number of input pins of the interface transceiver without sacrificing either speed or efficiency.

SUMMARY OF THE INVENTION

The previously mentioned needs are fulfilled with the present invention. Accordingly, there is provided, in one form, a circuit and method of operation for receiving and transmitting control and status information. The circuit includes a transceiver having an input for receiving a plurality of digital data values in a predetermined data bus protocol. Each one of the plurality of digital data values has a control component. The transceiver selectively modifies the control component of at least one of the plurality of digital data values to provide a modified control component at an output. The modified control component either has a digital status information value indicating a status of the transceiver or forms a program operand to control operation of the transceiver.

These and other features, and advantages, will be more clearly understood from the following detailed description taken in conjunction with the accompanying drawing.

DETAILED DESCRIPTION OF A PREFERRED EMBODIMENT

In one form, the present invention provides an interface transceiver which provides status and programming information via a plurality of predetermined control bits of a digital audio value. In particular, during transmission of digital audio data from a digital audio source to the interface transceiver, a plurality of eight channel status (C) bits which form a cyclic redundancy check character (CRCC) value for a block of digital audio data is compressed to form a modified CRCC value which may be expressed in a single bit. Seven remaining C bits are then used to transfer status information about the interface transceiver to a digital signal processor. Additionally, during transmission of digital data from the digital signal processor, a plurality of P bits is used to transfer programming information to the interface transceiver. The status information values are transferred from the interface transceiver using a single serial interface data pin. Similarly, the programming information values are transferred to the interface transceiver using a second serial interface data pin. Therefore, a single input pin of the interface transceiver is needed to transfer a plurality of status information values, and a second single input pin of the interface transceiver is needed to both receive digital audio data and programming information.

Figure 1:
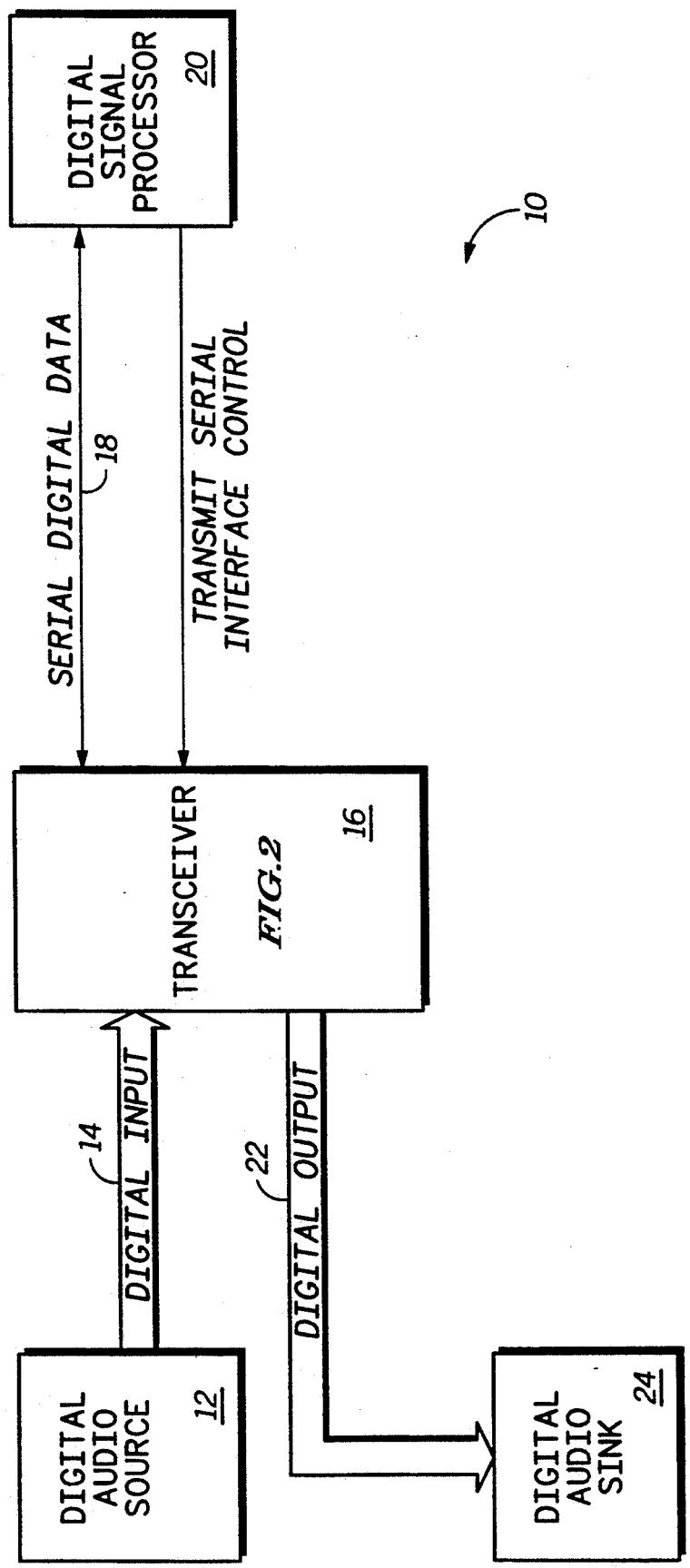
FIG. 1 illustrates in block diagram form a system having an interface transceiver circuit for communicating a plurality of digital data values between a digital audio source and a digital signal processor in accordance with the present invention.

Illustrated in FIG. 1 is a communications system 10 in accordance with the present invention. In general, communications system 10 has a digital audio source 12, a transceiver 16, a digital signal processor 20, and a digital audio sink 24.

In the implementation of the invention described herein, an output of digital audio source 12 is connected to an input of transceiver 16 via a conductor 14 labelled "Digital Input." Transceiver 16 subsequently communicates digital audio data with digital signal processor 20 via a Serial Digital Data conductor 18. Digital signal processor 20 also provides a control signal labelled "Transmit Serial Interface Control" to a control input of transceiver 16. An output of transceiver 16 is connected to an input of digital audio sink 24 via a conductor 22 labelled "Digital Output."

Digital audio source 12 may be implemented as one of many known digital transmitters such as a compact disc (CD) player or a digital audio tape (DAT) player. Additionally, professional recording equipment may also be used to perform the function provided by digital audio source 12. During operation, the output of digital audio source 12 provides a plurality of digital audio and non-audio information to the input of interface receiver 16 via the Digital Input conductor 14. The Digital Input conductor 14 transfers the plurality of digital audio and non-audio information in a serial format such as CP-340 or AES-EBU.

In the illustrated form, the plurality of digital audio and non-audio information transferred by Digital Input conductor 14 is Manchester encoded and transmitted in a series of frames. Manchester encoding allows information to be contained in a transition from a low value to a high value, or vice versa, in any one period of a source frequency. Two subframes, one for left channel information and a second for right channel information, are transmitted from digital audio source 12 to transceiver 16 in sequence in any one period of a frequency determined by digital audio source 12. The two subframes may also be referred to as a frame.

As previously discussed, each subframe has a predetermined number of time slots, where each time slot corresponds to a data bit of audio or control information. The first group of data bits of each subframe are preamble bits which are encoded to synchronize receiver system 10 to the source frequency of digital audio source 12. The second group of data bits transfer audio data information in two's complement form. The third group of data bits transfers non-audio, or control information such as the validity (V) bit, the user (U) bit, the channel status (C) bit, and the parity (P) bit. The C bit is used to form a group of data bits to control transmission of audio and non-audio information. For each one of the left and right audio channels, a block of channel status information is formed by accessing the C bit of each of 192 successive frames. Typically, the last eight C bits of each block are collectively referred to as the CRCC byte. The CRCC byte provides information necessary to test for failed reception of the entire block of channel status bits. The CRCC byte is typically generated by an industry standard equation further discussed in an Audio Engineering Society, Inc. paper published in 1985, and titled "AES Recommended Practice for Digital Audio Engineering-Serial Transmission Format for Linearly Represented Digital Audio Data." A start of the channel status block is indicated by a special preamble which is transmitted at a predetermined point in time typically occurring once during transmission of one hundred ninety-two frames.

Digital Input conductor 14 provides each of the plurality of digital audio and non-audio information values to transceiver 16. Transceiver 16 is illustrated in greater detail in FIG. 2. Transceiver 16 includes a digital input modifier 26, a storage register 30, a clock generator 32, a digital output modulator 34, and a digital transmit interface 38.

In transceiver 16, clock generator 32 receives a Clock Control signal from digital input modifier 26. Subsequently, clock generator 32 provides a reference clock frequency via a signal labelled "Reference Clock" to a clock input of digital input modifier 26. Clock generator 32 generally has a voltage controlled oscillator (not shown) which may be implemented with conventional circuitry. The Clock Control signal indicates the frequency at which the plurality of digital audio and non-audio information values are provided to transceiver 16 via the Digital Input conductor 14. Therefore, upon receipt of the Clock Control signal, clock generator 32 adjusts the reference clock frequency according to the difference between the frequencies of the Clock Control signal and the Reference Clock signal. For example, if the plurality of digital audio and non-audio information values is provided to digital input modifier 26 at a slower frequency than the Reference Clock signal, the Clock Control signal indicates to clock generator 32 that the Reference Clock signal should be slowed. Clock generator 32 may also perform a wide variety of functions such as frequency division.

Additionally, digital transmit interface 38 provides a plurality of program signals via a Program Word bus 35 to a plurality of control inputs of both digital input modifier 26 and digital output modulator 34. The plurality of program signals provides programming information which may be used to selectively enable either programmable input/output pins, a mode of operation, or a predetermined clock frequency of transceiver 16. Details of digital transmit interface 38 and generation of the plurality of program signals will be further discussed later.

Figure 3:
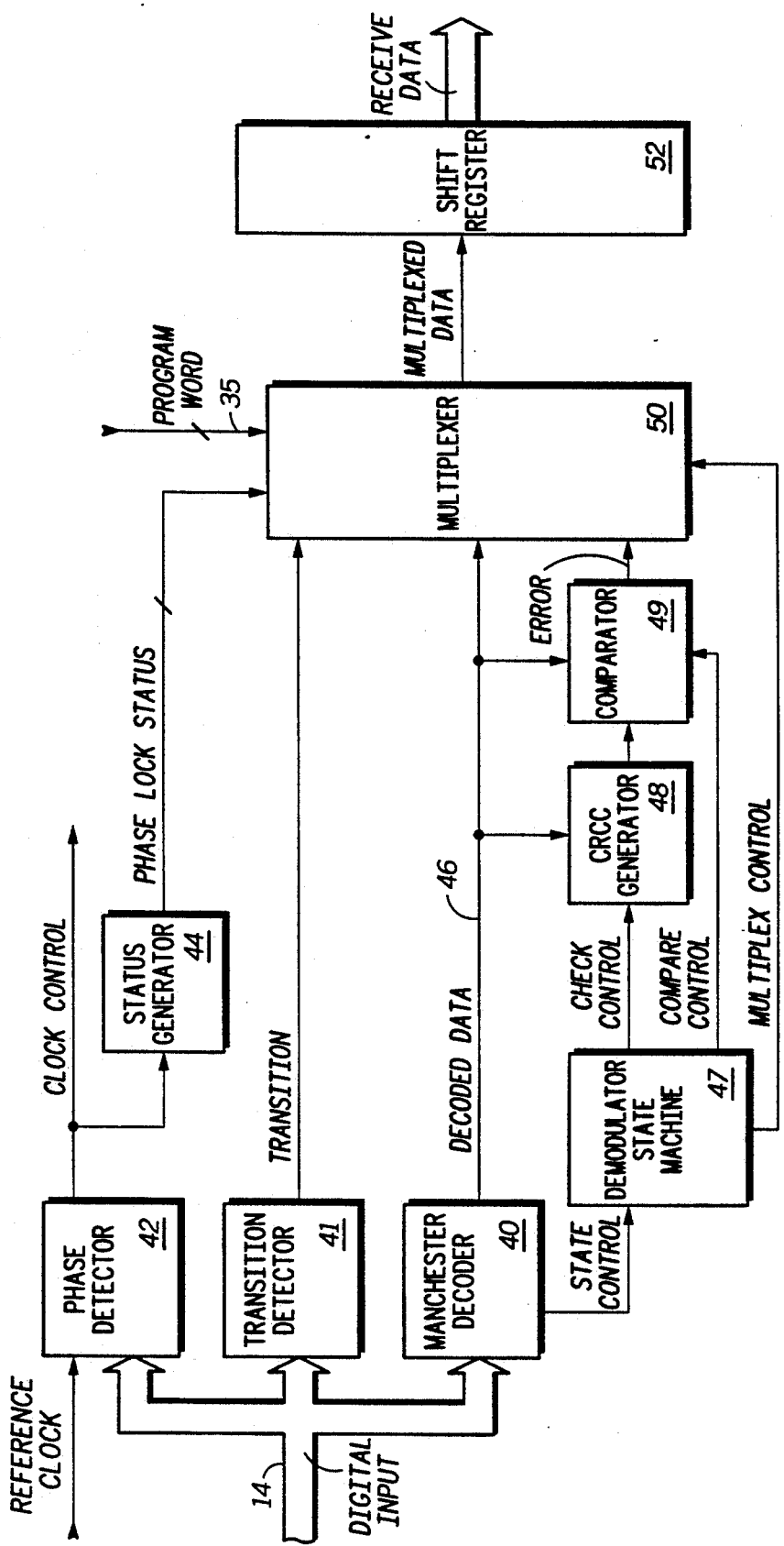
FIG. 3 illustrates in block diagram form a digital input modifier circuit of the interface transceiver of FIG. 2.

Digital input modifier 26 is illustrated in greater detail in FIG. 3. Digital input modifier 26 generally includes a Manchester decoder 40, a transition detector 41, a phase detector 42, a status generator 44, a demodulator state machine 47, a cyclic redundancy check character (CRCC) generator 48, a comparator 49, a multiplexer 50, and a shift register 52. In digital input modifier 26, Digital Input conductor 14 serially provides a plurality of digital audio information values, non-audio information values, and preambles to an input of each of Manchester decoder 40, transition detector 41, and phase detector 42.

Transition detector 41 processes the plurality of information values provided by Digital Input conductor 14 to determine whether or not an audio information signal is input to transceiver 16. If a transition occurs from a logic one value to a logic zero value, or vice versa, transition detector 41 asserts a signal labelled "Transition." The Transition signal provides a signal status information input to multiplexer 50.

Concurrently, phase detector 42 receives a clock input via the Reference Clock signal provided by clock generator 32. Phase detector 42 subsequently performs a phase lock loop operation in which the plurality of digital data values provided by Digital Input conductor 14 are processed to generate the Clock Control signal. The Clock Control signal is subsequently provided to both clock generator 32 and status generator 44. As previously mentioned, the Clock signal is used by clock generator 32 to adjust the frequency of the Reference Clock signal.

Status generator 44 processes the Clock Control signal to provide a plurality of phase lock status information values corresponding to the phase lock loop operation performed by phase detector 42. A Phase Lock Status signal provides the plurality of status information values containing phase lock status information to a phase lock status input of multiplexor 50. A first one of the plurality of status information values indicates whether phase detector 42 has locked to a plurality of digital data values provided by Digital Input conductor 14. A second one of the plurality of status information values indicates whether the clock frequency provided by the Reference Clock signal is too high compared to the frequency of the plurality of digital data values transferred by Digital Input conductor 14. Similarly, a third one of the plurality of status information values indicates whether the clock frequency provided by the Reference Clock signal is too low compared to the frequency of the plurality of digital data transferred via Digital Input conductor 14.

Additionally, Manchester decoder 40 decodes each of the plurality of digital audio and non-audio information values to provide a plurality of digital data values with either a logic high or a logic low value. Each of the plurality of digital data values is subsequently provided to CRCC generator 48, comparator 49, and multiplexer 50 via a conductor 46 labelled "Decoded Data." Manchester decoder 40 processes the preamble portion of each of the plurality of digital audio and non-audio information values to provide a signal labelled "State Control" to a control input to demodulator state machine 47.

Demodulator state machine 47 provides a Check Control signal to a control input of CRCC generator 48, a Compare Control signal to comparator 49, and a Multiplexor Control signal to a control input of multiplexer 50. Demodulator state machine 47 provides each of the Check Control signal, the Compare Control signal, and the Multiplex Control signal at a predetermined point in time such that digital input modifier 26 will function as described herein.

If a bit of the plurality of digital data values mentioned above is an audio information value, demodulator state machine 47 does not assert the control inputs of CRCC generator 48 or comparator 49. The Multiplex Control signal is asserted, however, and multiplexer 50 is enabled to receive the audio information provided by Decoded Data conductor 46.

If the bit of the plurality of digital data values is a portion of a channel status block, demodulator state machine 47 enables CRCC generator 48 to process each bit of the channel status block in a predetermined manner as determined by the AES-EBU and CP-340 specifications.

Furthermore, if the bit of the plurality of digital data values mentioned above is a portion of a CRCC byte (described above) of the channel status block, demodulator state machine 47 first asserts the Check Control signal to enable CRCC generator 48 to generate a theoretical CRCC bit using a conventional logic circuit (not shown) within CRCC generator 48. CRCC generator 48 then provides the theoretical CRCC bit to a first input of comparator 49. Concurrently, the actual CRCC bit is transferred to a second input of comparator via Decoded Data conductor 46. Demodulator state machine 47 then asserts the Compare Control signal to enable comparator 49 to perform a compare operation to determine if the theoretical and actual CRCC bits are identical. Comparator 49 compares each bit of the actual CRCC byte with a corresponding CRCC bit generated by CRCC generator 48. If any one of the bits which form the theoretical CRCC byte is different from a corresponding bit of the actual CRCC byte, comparator 49 subsequently asserts a single bit Error signal to multiplexer 50. The Error signal is provided to indicate whether or not an error occurred during transmission of the channel status block. For example, in one implementation, a logic one value may indicate that no error occurred during transmission of the channel status block and, conversely, a logic zero may indicate that an error did occur during transmission of the channel status block.

If the CRCC byte is compressed to a single bit by providing the Error signal, other status information may be transferred in a remaining portion of bits of the CRCC byte. Typically, the status information corresponds to operation of transceiver 16 and is provided by transition detector 41, status generator 44, and by the plurality of program signals transferred by Program Word bus 35.

As previously mentioned, Program Word bus 35 provides the plurality of program signals to control inputs of multiplexor 50. In the implementation described herein, a first portion of the status information value includes phase lock status information provided by status generator 44. The phase lock status information generally includes a first bit to indicate whether phase detector 42 has locked to a plurality of digital data values transferred by Digital Input conductor 14. Phase lock status information also includes a second bit to indicate whether the clock frequency provided by the Reference Clock signal is too high compared to the frequency of the plurality of digital data values transferred by the Digital Input conductor 14. Similarly, a third bit is provided to indicate whether the clock frequency provided by the Reference Clock signal is too low compared to the frequency of the plurality of digital data transferred via the Digital Input conductor 14. The Program Word bus 35 provides the second portion of the status information which includes a plurality of programming signals that respectively indicate a logic state of a plurality of programming bits transferred from the digital signal processor 20 via the Serial Digital Data conductor 18. The plurality of programming bits typically provides an user programmed value to control the operation of transceiver 16. Generation of the plurality of programming signals will be further discussed later. Additionally, a fourth bit of the status information is the error bit generated by the compression of the CRCC byte of a channel status block by comparator 49.

Each bit of the phase lock status information, the programming information, and the Error signal are concatenated to form the status information value. The status information value is eight bits long wherein only one bit is used to indicate the channel status block information typically transferred by the CRCC byte. The remaining seven bits are used to transfer status information about operation of transceiver 16. The information used to generate the status information value is provided by way of example only. Any type of information value may be used to provide status information corresponding to transceiver 16. Additionally, two CRCC bytes may be used to transfer a status information value which is sixteen bits long.

Upon receipt of one or a combination of: (1) the plurality of programming signals provided by the Program Word bus 35; (2) the plurality of digital data transferred by the Decoded Data conductor 46; (3) the plurality of bits containing phase lock status information; and (4) the Error signal; demodulator state machine 47 asserts the Multiplex Control signal to enable multiplexer 50 to provide an input labelled "Multiplexed Data" to shift register 52. Whether shift register 52 stores an audio information value or a status information value, the contents of shift register 52 are concurrently transferred in parallel to storage circuit 30 via a Receive Data conductor 28 at a first predetermined point in time.

At a second predetermined point in time, storage register 30 subsequently transfers either the plurality of digital data or the status information to digital signal processor 20 serially via the Serial Digital Data conductor 18. At a third predetermined point in time, digital signal processor 20 provides a second plurality of digital data to transceiver 16 via the Serial Digital Data conductor 18. Digital signal processor 20 also provides a signal labelled "Transmit Serial Interface Control" to a control input of transceiver 16.

Figure 2:
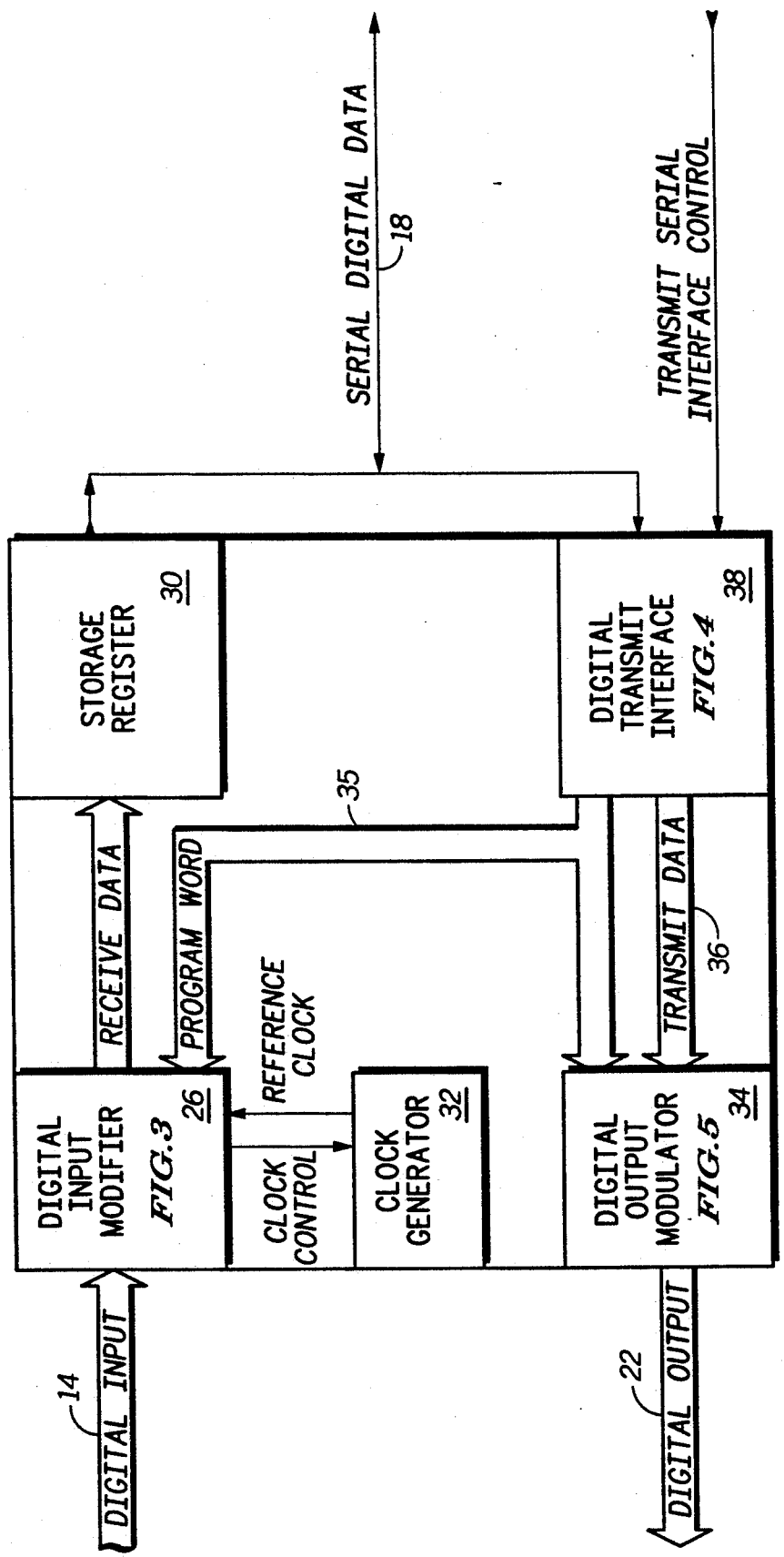
FIG. 2 illustrates in block diagram form the interface transceiver circuit of FIG. 1.

As illustrated in FIG. 2, the second plurality of digital data is serially provided to an input of digital transmit interface 38. Additionally, the Transmit Serial Interface Control signal is provided to a control input of digital transmit interface 38. Digital transmit interface 38 is illustrated in greater detail in FIG. 4.

Generally, digital transmit interface 38 has a shift register 54, an AND gate 56, a program shift register 58, a latch circuit 60, an Exclusive-OR gate 62, an AND gate 64, a program load register 66, and a transmit serial interface state machine 68. In the implementation described herein, latch circuit 60 is a clocked flip-flop circuit.

During operation, the second plurality of digital data provided by digital signal processor 20 is serially input to shift register 54. During transmission, an audio value corresponding to the left audio information channel is transmitted first. Subsequently, an audio value corresponding to the right audio information channel is transmitted. In each audio value, a first predetermined number of bits contains audio data, and a second predetermined number of bits contains non-audio, or control, data. In particular, a parity bit is included in the predetermined number of bits containing non-audio data. The format described herein for transmission of the second plurality of digital data is provided by way of example only. For example, the plurality of digital data may be transferred in a parallel form rather than serially, and may also be provided concurrently rather than sequentially.

In shift register 54, a first digital data value corresponding to the left audio information channel and a second digital data value corresponding to the right audio information channel are consecutively stored. The parity bit of each of the first and second digital data values is respectively labelled "Ap" and "Bp." During operation, parity bit Ap and parity bit Bp are respectively accessed from the first and second digital data values. The first digital data value and the second digital data value are then respectively transmitted to digital output modulator 34 via a Transmit Data conductor 36.

Parity bit Ap subsequently is connected a first input to AND gate 56. Parity bit Ap also provides a data input (D) to latch circuit 60, a first input to Exclusive-OR gate 62, and is connected to a first input of AND gate 64 which is an active low input. Parity bit Bp is connected to a data input to program shift register 58.

The Transmit Serial Interface Control signal is connected to an input of transmit serial interface state machine 68. Upon receipt of the Transmit Serial Interface Control signal, state machine 68 provides an enable output signal which is connected to an output to an enable (EN) input of latch circuit 60. The output of state machine 68 is also connected to a second input of AND gate 56 and a second input of AND gate 64. An output of AND gate 56 is connected to an enable (EN) input of program shift register 58. When enabled, program shift register 58 provides a plurality of (X+1) inputs which are connected to program load register 66, where X is an integer. The plurality of inputs is respectively labelled "P0" through "PX."

An output (Q) of latch circuit 60 is connected to a second input to Exclusive-OR gate 62. An output of Exclusive-OR gate 62 is connected to a third input to AND gate 64. An output of AND gate 64 is connected to an enable (EN) input to program load register 66. When enabled, program load register 66 provides a plurality of programming signals to both digital input modifier 26 and to digital output modulator 34 via Program Word bus 35.

During operation, a user of communications system 10 may safely assume that digital signal processor 20 can more efficiently provide programming information to transceiver 16 through use of the parity bit of each of the plurality of digital data values transferred via the Serial Digital Data conductor 18. Typically, because a physical connection between digital signal processor 20 and transceiver 16 generally has a scale of a few millimeters or centimeters, and not meters, parity information is not necessary. Parity information is typically only necessary during transmission of digital information between transceiver 16 and digital audio sink 24. Therefore, the user may program digital signal processor 20 such that the parity bit of each of the left and right channels of a frame of audio information are used as programming information. During transmission of digital data from transceiver 16 to digital audio sink 24, a plurality of parity information values is generated by a parity generator (not shown) in data modulator and preamble generator 82. In the example described herein, when parity bit Ap is a logic one value, parity bit Bp transmits programming information. When parity bit Ap is a logic zero value, either no operation occurs or a block reset is executed such that the next frame of digital audio data has a block synchronizing preamble. The block synchronizing preamble occurs once during transmission of one hundred ninety-two frames to indicate a beginning of a block of digital information. A summary of the operation defined by the parity bits in the implementation of the invention described herein is provided below in Table 1.

TABLE 1

| Ap | Bp | Operation |
|----|----|-----------|
| 0  | 0  | No operation |
| 0  | 1  | Block reset |
| 1  | 0  | Load a program bit 0 |
| 1  | 1  | Load a program bit 1 |

The operations specified in Table 1 may be executed by programming digital signal processor 20 to provide the appropriate values for parity bit Ap of a first digital data value and parity bit Bp of a second digital data value. The first and second digital data values, respectively including parity bits Ap and Bp, are transferred to transceiver 16 via Serial Digital Data conductor 18.

For example, assume that the user of communications system 10 determines that no operation should occur and programs digital signal processor 20 to provide both parity bit Ap and parity bit Bp with logic zero values. The first digital data value including parity bit Ap is input to shift register 54. Similarly, the second digital data value which includes parity bit Bp is input to shift register 54. The digital data values are then transmitted to digital output modulator 34 via Transmit Data conductor 36.

Parity bit Ap is a logic zero at the first input of AND gate 56, at the data input of latch circuit 60, at the first input of Exclusive-OR gate 62, and at the active low first input of AND gate 64. Assuming parity bit Ap is a logic zero, the output of AND gate 56 provides a logic zero to the enable input of program shift register 58. Therefore, program shift register 58 is not enabled to provide the plurality of programming information to program load register 66.

As well, the Transmit Serial Interface Control signal provides an input to transmit serial interface state machine 68. State machine 68 subsequently provides the enable signal to latch circuit 60 and the second input to AND gate 64. Latch circuit 60, therefore, provides a logic zero to the second input of Exclusive-OR gate 62 forcing the output of Exclusive-OR gate 62 to a logic zero. The enable input of program load register 66 is then provided a logic zero value. Therefore, program load register 66 is not enabled to provide the plurality of programming signals via the Program Word bus 35.

Subsequently, the parity bits Ap and Bp do not perform any function in digital transmit interface 38, and the first and second digital data values are transferred to digital output modulator 34 by Transmit Data conductor 36.

Figure 5:
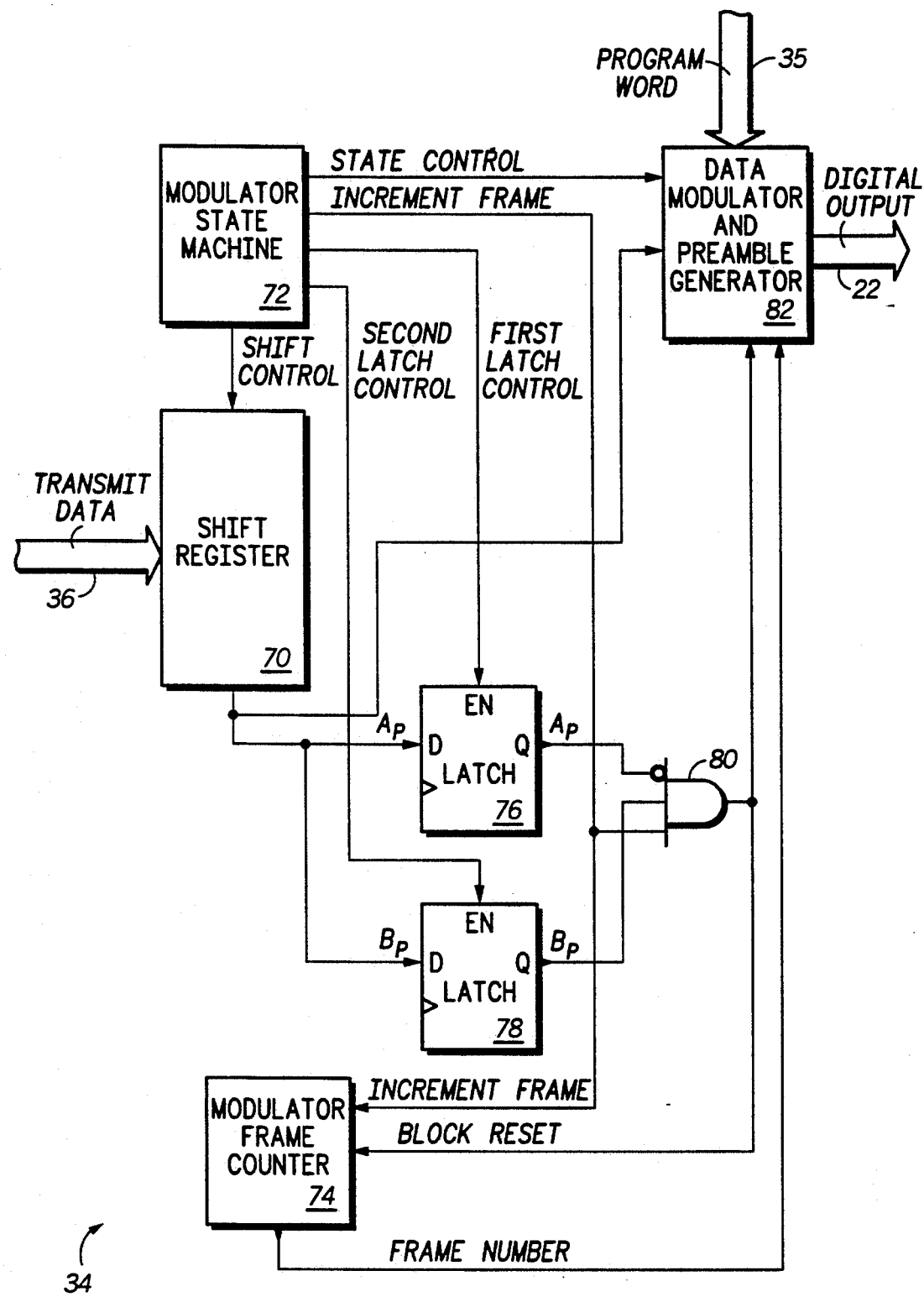
FIG. 5 illustrates in partial block diagram format digital output modulator circuit of the interface transceiver of FIG. 2.

The first and second digital data values respectively including parity bits Ap and Bp are also provided to digital output modulator 34. Digital output modulator 34 of FIG. 2 is illustrated in greater detail in FIG. 5. Generally, digital output modulator 34 includes a shift register 70, a modulator state machine 72, a modulator frame counter 74, a first latch circuit 76, a second latch circuit 78, an AND gate 80, and a data modulator and preamble generator 82. In the implementation described herein, latch circuit 76 and latch circuit 78 are both implemented as a clocked flip-flop circuit.

In digital output modulator 34, modulator state machine 72 provides a plurality of control signals. A first one of the plurality of control signals is labelled "Shift Control." The Shift Control signal provides a control input to shift register 70. A second one of the plurality of control signals is labelled "State Control." The State Control signal provides a control input to data modulator and preamble generator 82. A third one of the plurality of control signals is labelled "Increment Frame." The Increment Frame signal provides a first input to AND gate 80 and provides a control input to modulator frame counter 74. A fourth one of the plurality of control signals is labelled "First Latch Control." The First Latch Control signal is coupled to an enable (EN) input of latch circuit 76. Similarly, a fifth one of the plurality of control signals is labelled "Second Latch Control." The Second Latch Control signal is coupled to an enable input to latch circuit 78.

The first and second digital data values are transmitted to shift register 70 via the Transmit Data conductor 36. Shift register 70 then provides a predetermined one of either the first or second digital data values to a data (D) input of latch circuit 76, to a data (D) input of latch circuit 78, and to a data input of data modulator and preamble generator 82. A (Q) output of latch circuit 76 is connected to an active low input as a second input to AND gate 80. Similarly, a (Q) output of latch circuit 78 provides a third input to AND gate 80. An output of AND gate 80 provides a signal labelled "Block Reset." The Block Reset signal is input to a reset input of modulator frame counter 76 and a reset input of data modulator and preamble generator 82. Modulator frame counter 76 provides a signal labelled "Frame Number" to a count input of data modulator and preamble generator 82. Data modulator and preamble generator 82 subsequently provides a plurality of modulated digital data values via Digital Output conductor 22. Data modulator and preamble generator 82 also generates parity information which is transferred in addition to the plurality of modulated digital data values via Digital Output conductor 22.

Modulator state machine 72, in one form, is a free-running conventional counter circuit (not shown in detail) which provides the frequency of operation of digital output modulator 34. Modulator state machine 72 selectively determines when each of the components included in digital output modulator 34 should be enabled. For example, modulator state machine 72 provides the State Control signal to the control input of data modulator and preamble generator 82. Additionally, modulator state machine 72 provides the Shift Control signal to the control input of shift register 70, the First Latch Control signal to the enable (EN) input of latch circuit 76, the Second Latch Control signal to the enable input of latch circuit 78, and the Increment Frame signal to both the control input of modulator frame counter 74 and the first input of AND gate 80.

During operation, the first and second digital data values are provided to digital output modulator 34 and are transferred to shift register 70. Modulator state machine 72 selectively asserts the Shift Control signal to enable shift register 70 to shift the first and second digital data values to a data input of each of latch circuit 76, latch circuit 78, and data modulator and preamble generator 82 at a predetermined point in time.

Subsequently, modulator state machine 72 asserts the First Latch Control signal to latch parity bit Ap at a first predetermined point in time. Similarly, modulator state machine 72 asserts the Second Latch Control signal to latch parity bit Bp at a second predetermined point in time.

When the first and second digital data values are modulated by data modulator and preamble generator 82, the Increment Frame signal is not asserted by modulator state machine 72. A frame count is provided by modulator frame counter 74 via the Frame Number signal once per frame, but not when either the first or second digital data value is shifted from shift register 70 to data modulator and preamble generator 82. As well, because parity bit Ap is not a logic zero and parity bit Bp is not a logic one, AND gate 80 does not assert a Block Reset signal to reset modulator frame counter 74. Modulator frame counter 74 also does not increment a count of a frame number of the first and second digital data values. The count of the frame number is provided to a count input of data modulator and preamble generator 82 via the Frame Number signal. Modulator state machine 72 then asserts the Increment Frame signal to enable modulator frame counter 74 to increment the count of the frame number transferred to data modulator and preamble generator 82.

The first and second digital data values and the Frame Number signal are serially provided to data modulator and preamble generator 82 one bit at a time. Modulator state machine 72 asserts the State Control signal to enable data modulator and preamble generator 82 to modulate each of the bits of the first and second digital data values. The Frame Number signal is used to determine a preamble for each of the modulated digital data values. For example, the Frame Number signal may be used to determine whether or not a special block preamble should be transmitted in place of a predetermined preamble of a digital information value. Subsequently, the modulated digital data values and the respective preambles are transferred to digital audio sink 24 via the Digital Output conductor 22 when the State Control signal is asserted by modulator state machine 72.

In a second example, assume that the user of communications system 10 determines that a zero logic value should be programmed in transceiver 16, and programs digital signal processor 20 to provide parity bit Ap with a logic one value and parity bit Bp with logic zero value. Again, a first digital data value including parity bit Ap is input to shift register 54. Similarly, a second digital data value including parity bit Bp is input to shift register 54. Both parity bit Ap and parity bit Bp are accessed from the first and second digital data values and processed by digital transmit interface 38. The first and second digital data values are provided to digital output modulator 34 via Transmit Data conductor 36.

Parity bit Bp provides the logic zero value to the input of program shift register 58 of FIG. 4 where it may be subsequently stored. Parity bit Ap concurrently provides a logic one to the first input of AND gate 56, to the data input of latch circuit 60, to the first input of Exclusive-OR gate 62 and to the inverted input of AND gate 64. As previously mentioned, the Transmit Serial Interface Control signal provides an input to transmit serial interface state machine 68. State machine 68 subsequently provides the enable input to latch circuit 60, to the second input of AND gate 64, and to the second input of AND gate 64.

When transmit serial interface state machine 68 provides the enable input to latch circuit 60, AND gate 56 provides a logic one to enable program shift register 58 to provide the plurality of programming information values to program load register 66. As well, latch circuit 60 is enabled to store parity bit Ap as a logic one. Parity bit Ap is input to AND gate 64 and, therefore, program load register 66 is not enabled to provide the plurality of programming signals via the Program Word bus 35. A plurality of programming operations may be executed to load program load register 66 with programming information having a predetermined length.

Figure 4:
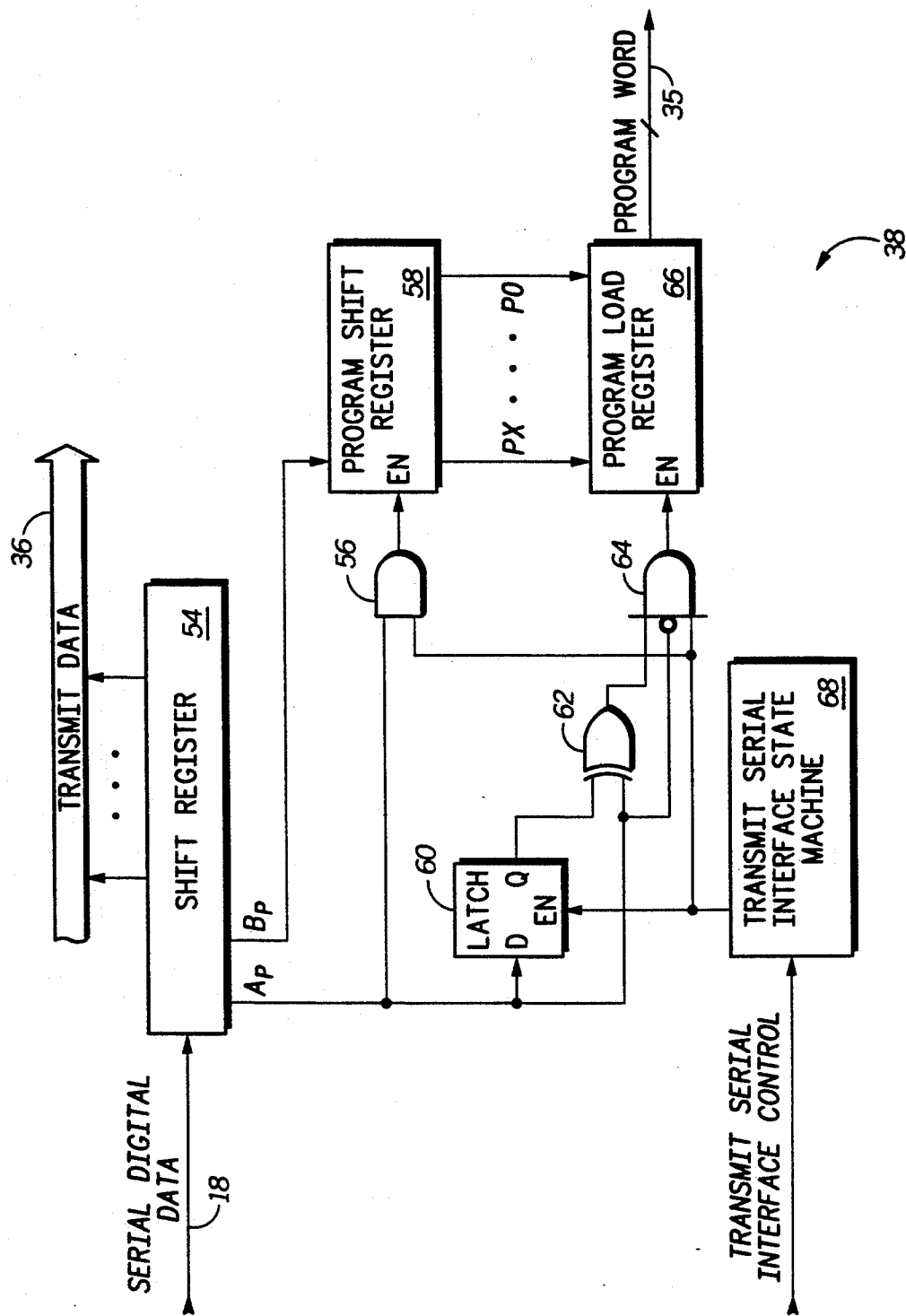
FIG. 4 illustrates in block diagram form a digital transmit interface circuit of the interface transceiver of FIG. 2.

When programming a logic one, digital transmit interface circuit 38 illustrated in FIG. 4 functions similarly to the operations necessary to program a logic zero value previously described. Rather than providing parity bit Bp with a logic zero, however, the user of communications system 10 must program digital signal processor 20 such that parity bit Bp has a logic one. Therefore, when the plurality of programming information signals is transferred from program load register 66, a logic one has been stored therein, rather than a logic zero as was previously discussed.

When program load register 66 has been fully programmed, both parity bit Ap and parity bit Bp are subsequently provided with logic zeroes. Therefore, the program shift register 58 is not enabled to provide any other programming information value. However, the Transmit Serial Interface Control signal allows the transmit serial interface state machine 68 to provide a logic one to the enable input of latch circuit 60. When enabled, latch circuit 60 provides the last value of parity bit Ap stored therein. Because parity bit Ap is a logic one when programming any value, latch circuit 60 provides a logic one to the second input of Exclusive-OR gate 62. The output of Exclusive-OR gate 62 is then a logic one. At that point, the output of AND gate 64 is also a logic one and program load register 66 is enabled to provide the plurality of programming signals via Program Word bus 35.

In a third example, assume the user of the digital signal processor 20 programs parity bit Ap and parity bit Bp such that a block reset should occur. Therefore, the user of communications system 10 programs digital signal processor 20 to provide parity bit Ap with a logic zero and parity bit Bp with a logic one. Again, a first digital data value corresponding to parity bit Ap is input to shift register 54. Similarly, a second digital data value including parity bit Bp is input to shift register 54. Both parity bit Ap and parity bit Bp are accessed from the first and second digital data values, and respectively processed by digital transmit interface 38. Subsequently, the first and second digital data values are provided to digital output modulator 34 via Transmit Data conductor 36.

Parity bit Ap subsequently provides a logic zero to the first input of AND gate 56, to the data input of latch circuit 60, to the first input of Exclusive-OR gate 62 and to the inverted input of AND gate 64. Because parity bit Ap is a logic zero, the output of AND gate 56 provides a logic zero to the enable input of program shift register 58. Therefore, program shift register 58 is not enabled to provide the plurality of programming information to program load register 66.

The Transmit Serial Interface Control signal also provides an input to transmit serial interface state machine 68. State machine 68 subsequently provides the enable signal to both latch circuit 60 and the second input to AND gate 64. Latch circuit 60, therefore, provides a logic zero to the second input of Exclusive-OR gate 62 such that the output of Exclusive-OR gate 62 is a logic zero. The enable input of program load register 66 is then provided a logic zero such that program load register 66 is not enabled to provide the plurality of programming signals via Program Word bus 35.

Concurrently, the first and second digital data values respectively including parity bits Ap and Bp, are transferred to digital output modulator 34. As previously mentioned, parity bit Ap and parity bit Bp are transferred to shift register 70 via the Transmit Data conductor 36. Modulator state machine 72 selectively asserts the Shift Control signal to enable shift register 70 to shift both parity bit Ap and parity bit Bp to a data input of each of latch circuit 76, latch circuit 78, and data modulator and preamble generator 82.

Modulator state machine 72 also asserts the First Latch Control signal and the Second Latch Control signal respectively at first and second respective predetermined points in time. Therefore, latch circuit 76 and latch circuit 78 are respectively enabled to transfer only parity bit Ap and parity bit Bp, and not another portion of the first and second digital data values. When enabled, latch circuit 76 transfers parity bit Ap to the active low input of AND gate 80. Similarly, latch circuit 78 transfers parity bit Bp to a second input of AND gate 80. Therefore, during a block reset operation, parity bit Ap provide a logic zero to the first input of AND gate 80, and parity bit Bp provides a logic one to the second input of AND gate 80, thereby generating the block reset signal.

Additionally, after each of the parity bits Ap and Bp is respectively latched by latch circuit 76 and latch circuit 78, modulator state machine 72 asserts the Increment Frame signal at the end of a frame of digital information. The Increment Frame signal provides both the third input to AND gate 80 and the count increment input of modulator frame counter 74. During a block reset operation, the output of AND gate 80 is a logic one and a block reset input of modulator frame counter 74 is enabled to reset the frame number to zero. Although the Increment Frame signal indicates that the frame number should be incremented, the block reset input of modulator frame counter 74 has the highest priority and is executed. The Frame Number signal provided to the count input of data modulator and preamble generator 82. Additionally, the output of AND gate 80 also enables data modulator and preamble generator 82 to respond to a block reset. Therefore, the frame number provided by the Frame Number signal is reset to zero.

The first and second digital data values are then provided to data modulator and preamble generator 82 one bit at a time. The Frame Number signal is also provided to data modulator and preamble generator 82. Modulator state machine 72 asserts the State Control signal to enable data modulator and preamble generator 82 to modulate each bit of the first and second digital data values. Again, the Frame Number signal is used to determine a preamble for each of the modulated digital data values. In the third example, the Frame Number signal indicates the modulated digital data values are the beginning of a block of information. Subsequently, the modulated digital data values and the respective preambles are transferred to digital audio sink 24 via the Digital Output conductor 22.

In one implementation of the invention, the user of transceiver 16 may determine that all zeroes should be output to the digital audio sink 24 via the Digital Output conductor 22. To perform such an operation, the user would provide appropriate programming and control information to the digital output modulator 34 via the Program Word conductor 35. In digital output modulator 34, the programming and control information is provided to the data modulator and preamble generator 82 to enable generator 82 to provide all zeroes rather than the actual data transferred by Transmit Data conductor 36.

Transmit interface circuit 38 of transceiver 16 allows a user of the communications system 10 the flexibility of choosing to either use the parity bits to perform a predetermined parity function or as programming information. The user interface required to use the parity bits in either function may be implemented as a software program in digital signal processor 20. The software program may be implemented in a standard and conventional form.

There has been provided herein a transceiver circuit for transmitting and receiving digital status and programming information between a data processing system and either a digital audio source or sink, using a predetermined serial data bus protocol such as CP-340 or AES-EBU. When receiving digital audio data from the digital data source, the CRCC byte is manipulated to form a single bit. The remaining unused bits in the CRCC byte are then used to transfer status information corresponding to operation of transceiver 16. The status information may include information concerning operation of phase detector 42 and the state of external programming pins (not shown) of transceiver 16. However, the status information should not be limited to the implementations described herein. A wide variety of auxiliary status and control information may be transferred via the unused bits in the CRCC byte. Therefore, status information corresponding to transceiver 16 may be transferred to digital signal processor 20 without an interruption in the flow of digital audio information. Additionally, because the status information is provided serially with the digital audio information, no external pins of either transceiver 16 or digital signal processor 20 are required to respectively transfer and receive the status information. As well, status information is not transferred more than once as in previous implementations of interface receivers.

When receiving digital data from the digital signal processor, the parity bits of each of the plurality of digital values are used to transfer programming information rather than parity information. Because the parity information between the digital signal processor 20 and transceiver 16 is not generally necessary, the parity bits may be used to transfer programming information necessary for transceiver 16 to function properly. However, since the parity bits are needed to transfer parity information from the transceiver 16 to the digital audio sink 24, the parity generator (not shown) in data modulator and preamble generator 82 is used to calculate a new parity information value. Like the use of the CRCC byte to transfer status information, the use of the parity bits to transfer programming information generally increases the efficiency of communications system 10. The flow of digital data from digital signal processor 20 is not interrupted when programming information is input to transceiver 16. Additionally, additional external pins of transceiver 16 do not have to be dedicated to receive the programming information.

It should be well understood that the interface transceiver described herein provides an efficient solution to communicate status, control, and programming information between a digital signal processor and either a digital data source or a digital data sink. The implementation of the invention described herein is provided by way of example only, however, and many other implementations may exist for executing the functions described herein. For example, transceiver 16 may be implemented as either a receiver or a transmitter, and not a combination of both as is illustrated herein. Digital audio source 12 may be implemented as any digital transmitter, such as a compact disc (CD) player or a digital audio tape (DAT) player. Additionally, professional recording equipment may also be used to perform the function provided by digital audio source 12. Digital signal processor 20 may be implemented as any circuit which is able to receive or provide digital information. For example, the function performed by digital signal processor 20 might be implemented as a memory circuit with some glue logic. In the implementation described herein, the plurality of digital audio data is transmitted in an industry standard format, such as CP-340 or AES-EBU. In transceiver 16, digital input modifier 26 is implemented using conventional logic and storage circuits. For example, although the function performed by CRCC generator 48 is unique, CRCC generator 48 may be implemented using conventional logic circuitry. As well, latch circuit 60, latch circuit 76, and latch circuit 78 may each be implemented as any type of clocked flip-flop circuit which stores an input value until a next clock edge is detected and an enable input is asserted.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A circuit for receiving and transmitting control and status information, comprising:
    input means for receiving a plurality of digital data values in a predetermined data bus protocol, the plurality of digital data values in the predetermined data bus protocol transferring a cyclic redundancy check character byte at a predetermined point in time;
    a status information circuit having an input for receiving the plurality of digital data values, the status information circuit processing the plurality of digital data values to provide a status information signal;

a check byte generator having an input for receiving the plurality of digital data values, the check byte generator processing the plurality of digital data values to provide a theoretical cyclic redundancy check character byte at the predetermined point in time;

a comparator having a first input for receiving the cyclic redundancy check character byte transferred with the plurality of digital data values and a second input coupled to the check byte generator for receiving the theoretical cyclic redundancy check character byte, the comparator comparing the cyclic redundancy check character byte and the theoretical cyclic redundancy check character byte to provide a single check signal indicating if an error occurred during transmission of the plurality of digital data values;

a multiplexer having a plurality of data inputs coupled to the input means for receiving the plurality of digital data values, a first status input for receiving the status information signal from the status information circuit, and a second status input for receiving the single check signal, the multiplexer concatenating the status information signal and the single check signal to form a status value, the multiplexer selectively providing the status value in response to receipt of the check byte and otherwise providing the plurality of digital data values; and an output means coupled to the multiplexer for providing either the plurality of digital data values or the status value.

2. A circuit for receiving and transmitting control and status information, comprising:

an input interface having an input for receiving a plurality of digital data values in a predetermined serial data bus protocol, the input interface accessing both a first control component of a first one of the plurality of digital data values and a second control component of a second one of the plurality of digital data values, the input interface using the second control component to form a program operand and using the first control component to enable a first output of the input interface to provide the program operand, the input interface also having a second output for providing the first and second ones of the plurality of digital data values; and a program circuit having an input coupled to the input interface for receiving the program operand, the program circuit processing the program operand to enable the circuit for receiving and transmitting control and status information to perform a predetermined function.

3. The circuit for receiving and transmitting control and status information of claim 2 wherein the program circuit further comprises:

a digital output modulator having an input coupled to the input interface for receiving the first and second one of the plurality of digital data values, the digital output modulator further processing the first and second control components to provide a signal to assert a block reset signal, the block reset signal being used to indicate a start of a block of the plurality of digital data values.

4. A transceiver circuit for receiving and transmitting control and status information, comprising:

a receiver having an input for receiving a first plurality of digital data values in a predetermined data bus protocol, each one of the first plurality of digital data values having a control component, the receiver selectively modifying the control component of at least one of the first plurality of digital data values to provide a modified control component at an output, the modified control component having a digital status information value indicating a status of the receiver;

a transmitter having an input for receiving a second plurality of digital data values in the predetermined data bus protocol, each one of the second plurality of digital data values having a parity component, the transmitter selectively using the parity component to form a program operand to control operation of the transceiver circuit, the transmitter providing an output in response to the program operand;

a digital audio source coupled to the input of the receiver for providing the first plurality of digital data values in the predetermined data bus protocol;

a data processor coupled to the output of the receiver to receive the modified control component, the data processor using the modified control component to execute a predetermined data processing function, the data processor also being coupled to the input of the transmitter to provide the second plurality of digital data values having the parity component, the data processor programming the parity component to contain a portion of the program operand and reduce a total number of programming inputs required to implement the data processor and the transceiver circuit; and a digital audio sink coupled to the output of the transmitter for receiving the output provided in response to the program operand.

5. The transceiver circuit for receiving and transmitting control and status information of claim 4 wherein the predetermined data bus protocol is an AES-EBU standard format.

6. The transceiver circuit for receiving and transmitting control and status information of claim 4 wherein the predetermined data bus protocol is a CP-340 format.

7. A method for receiving and transmitting control and status information, comprising the steps of:

providing an input means for receiving a plurality of digital data values in a predetermined data bus protocol, the plurality of digital data values in the predetermined data bus protocol providing a cyclic redundancy check character byte at a predetermined point in time;

providing a status information circuit having an input for receiving the plurality of digital data values, the status information circuit processing the plurality of digital data values to provide a status information signal;

providing a check byte generator having an input for receiving the plurality of digital data values, the check byte generator processing the plurality of digital data values to provide a theoretical cyclic redundancy check character byte at the predetermined point in time;

providing a comparator having a first input for receiving the cyclic redundancy check character byte transferred with the plurality of digital data values and a second input coupled to check byte generator for receiving the theoretical cyclic redundancy check character byte, the comparator comparing the check byte and the theoretical cyclic redundancy check character byte to provide a single check signal indicating if an error occurred during transmission of the plurality of digital data values; and providing a multiplexer having a plurality of data inputs coupled to the input means for receiving the plurality of digital data values, a first status input for receiving the status information signal from the status information circuit, and a second status input for receiving the single check signal, the multiplexer concatenating the status information signal and the single check signal to form a status value, the multiplexer selectively providing the status value in response to receipt of the check byte and otherwise providing the plurality of digital data values.

8. A method for receiving and transmitting control and status information, comprising the steps of:

providing an input interface circuit having an input for receiving a plurality of digital data values in a predetermined serial data bus protocol, the input interface circuit accessing both a first control component of a first one of the plurality of digital data values and a second control component of a second one of the plurality of digital data values, the input interface circuit using the second control component to form the program operand and using the first control component to enable a first output of the input interface to provide the program operand, the input interface circuit also having a second output for providing the first and second of the plurality of digital data values; and coupling an input of a program circuit to the input interface circuit for receiving the program operand, the program circuit processing the program operand to enable the transceiver to perform a predetermined programmed function.

9. The method of receiving and transmitting control and status information of claim 8 further comprising the step of:

coupling an input of a digital output modulator to the input interface circuit for receiving the first and second of the plurality of digital data values, the digital output modulator further processing the first and second control components to provide a signal to assert a block reset signal, the block reset signal being used to indicate a start of a block of the plurality of digital data values.

10. A transceiver for receiving and transmitting digital information, comprising:

an input interface for receiving a plurality of digital data values in a predetermined data bus protocol, each one of the plurality of digital data values having a first control component of a first bit width;

a byte generator having an input for receiving each one of the plurality of digital data values, the byte generator processing each one of the plurality of digital data values to provide a theoretical control component;

a comparator having a first input for receiving the first control component and a second input for receiving the theoretical control component, the comparator comparing the first control component and the theoretical control component to determine if an error occurred during transmission of the plurality of digital data values, the comparator having an output for providing a compressed control value having a second bit width in response to comparing the first control component and the theoretical control component;

status detection means for determining a plurality of status information values corresponding to the plurality of digital data values, the plurality of status information values indicating a status of the transceiver, the status detection means being coupled to the interface means for receiving the plurality of digital data values; and output means for transmitting a modified control value, the modified control value being formed by the concatenation of the compressed control value and the plurality of status information values, the output means coupled to the comparator for receiving the compressed control value, the output means coupled to the status detection means for receiving the plurality of status information values.

11. The transceiver of claim 10 wherein the first control component is a cyclic redundancy check character byte.

12. The transceiver of claim 10 wherein the second bit width is a single bit.

13. The transceiver of claim 10 wherein a first one of the plurality of status information values is a phase lock status information value.

14. The transceiver of claim 10 wherein a first one of the plurality of status information values is a transition status information value.

15. The transceiver of claim 10 wherein the predetermined data bus protocol is one of an AES-EBU standard format and a CP-340 format.

16. A transceiver for receiving and transmitting digital information, comprising:

an input interface having an input for receiving a plurality of digital data values, each one of the plurality of digital data values having a data component and a control component, the input interface accessing both a first control component of a first one of the plurality of digital data values and a second control component of a second one of the plurality of digital data values;

a program register having a data input coupled to the input interface for receiving the first control component, the program register storing the first control component to form a program operand, the program register having an output for providing the program operand in response to a first enable signal; and timing means for selectively generating the first enable signal in response to the second control component, the timing means being coupled to the input interface for receiving the second control component.

17. The transceiver for receiving and transmitting digital information of claim 16 wherein each of the first and second control components is a parity bit.

18. The transceiver for receiving and transmitting digital information of claim 16 wherein the program operand is provided to enable the transceiver to perform a programmed function.

19. The transceiver for receiving and transmitting digital information of claim 16 wherein the timing means further comprises:

a state machine for providing a state timing signal; and a logic circuit having a first input coupled to the input interface for receiving the second control component, the logic circuit having a second input coupled to the state machine for receiving the state timing signal, the logic means logically combining the state timing signal and the second control component to generate the first enable signal.

20. The transceiver for receiving and transmitting digital information of claim 16 wherein the timing means selectively generates a second enable signal to enable the program register to store the first control component, the timing means generating the second enable signal in response to the second control component, the timing means being coupled to the program register for providing the second control component.

* * * * *